(12) United States Patent
Voss et al.

(10) Patent No.: US 6,644,623 B1
(45) Date of Patent: Nov. 11, 2003

(54) ELECTROMAGNETIC VALVE

(75) Inventors: Christoph Voss, Frankfurt am Main (DE); Ralf Kaiser, Mainz-Kastel (DE); Frank Holl, Marienhausen (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 111 days.

(21) Appl. No.: 10/019,327

(22) PCT Filed: Jun. 20, 2000

(86) PCT No.: PCT/EP00/05653

§ 371 (c)(1),
(2), (4) Date: Dec. 21, 2001

(87) PCT Pub. No.: WO01/00473

PCT Pub. Date: Jan. 4, 2001

(30) Foreign Application Priority Data

Jun. 23, 1999 (DE) .......................................... 199 28 750
Aug. 6, 1999 (DE) .......................................... 199 36 711

(51) Int. Cl.[7] .......................... B60T 13/68; F16K 31/06
(52) U.S. Cl. .............................. 251/129.15; 251/129.01
(58) Field of Search ........................ 251/129.01–129.22

(56) References Cited

U.S. PATENT DOCUMENTS

| | | | | |
|---|---|---|---|---|
| 4,002,318 A | * | 1/1977 | von Koch | 251/129.08 |
| 5,428,883 A | * | 7/1995 | Stieglitz | 251/129.15 |
| 6,138,986 A | * | 10/2000 | Krimmer et al. | 251/129.02 |
| 6,341,759 B1 | * | 1/2002 | Noller et al. | 251/129.15 |
| 6,367,434 B1 | * | 4/2002 | Steigerwald et al. | 251/129.15 |

FOREIGN PATENT DOCUMENTS

| | | |
|---|---|---|
| DE | 196 04 315 | 8/1997 |
| DE | 197 00 405 | 7/1998 |
| DE | 197 08 425 | 9/1998 |
| DE | 197 10 353 | 9/1998 |
| DE | 197 11 375 | 9/1998 |
| DE | 198 37 207 | 9/1999 |
| DE | 198 43 762 | 3/2000 |

OTHER PUBLICATIONS

Search Report of the German Patent Office For Appln 19928750.3.
Search Report of the German Patent Office for Appln 19936711.6.

* cited by examiner

Primary Examiner—Paul J. Hirsch
(74) Attorney, Agent, or Firm—Rader, Fishman & Grauer PLLC (57) ABSTRACT

The invention relates to an electromagnetic valve, with a valve tappet guided in a valve housing that exhibits a valve-closing element, with a valve-seat holding element facing the valve-closing element, which forms an independent subassembly together with the valve housing, as well as with an armature that activates the valve tappet and can be excited by means of a valve coil arranged on the valve housing. The armature is designed as a cold extrusion pressed part and the valve housing is designed as a deep drawn part or cold extrusion pressed part.

9 Claims, 10 Drawing Sheets

ELECTROMAGNETIC VALVE

TECHNICAL FIELD

The present invention relates to an electromagnetic valve.

BACKGROUND OF THE INVENTION

These types of conventional valves, known in the prior art, for regulating the flow of fluids in slip-controlled hydraulic brake systems are being used in many practical applications.

DE 198 088 26 A1 already disclosed an electromagnetic valve for a slip-controlled hydraulic brake system that is open in its starting position. It has a cartridge-type valve housing which preferably is executed as a turned part from machining steel and wedged into a block-shaped valve-holding element. The valve plate forming the valve seat also preferably is made from a relatively solid turned part of machining steel, which is held at the lower end of the valve housing by means of a wedge. The valve tappet acting together with the valve seat is guided within the valve housing and is a solid shaft part consisting of a solid cylinder, which is supported on one face of the armature in connection with an adjusting bushing, with the armature being guided along the valve housing within the area of the valve sleeve. In order to keep the valve tappet lifted away from the valve seat in the starting position of the electromagnetic valve, a so-called pull-back spring is provided co-axially to the valve tappet, and it pushes the valve tappet with the adjusting bushing in the direction of the armature with one end of its spring.

Electromagnetic valves that are closed in their starting position also have been disclosed, for example in DE 19 72 7654 A1. In contrast to the above-described valve that is open in its starting position, the valve tappet, which is cut from a solid, in the valve closed in its starting position is an essentially independent assembly with the armature, and this subassembly is oriented towards the valve seat by means of a pressure spring supported on the magnetic core, keeping this closed in the above-mentioned starting position of the electromagnetic valve.

A disadvantage of the above-mentioned electromagnetic valves is the relatively extensive manufacturing process required for producing the individual units of the valve as well as the production and application of a functioning overall assembly in a valve holding element.

Thus, it is the object of the present invention to improve the design of an electromagnetic valve that is open or closed in its starting position in such a way that the manufacturing process can be significantly reduced while still ensuring the functional safety and maintaining a relatively simple, miniaturized design.

Detailed Description of The Preferred Embodiments

On the basis of FIG. 1a, the basic design of the electromagnetic valve that is open in its starting position will be described. The cross-section of the electromagnetic valve shows a bush-shaped valve housing 3 that has guide surfaces 3a, 3b on both ends to hold a dome-shaped valve sleeve 1 and, on the other end, a pot-shaped valve-seat holding element 7. Thus, the valve housing 3 forms a suitable central element for the above-mentioned parts, which simultaneously assumes the function of the magnetic core 25. In order to achieve low-cost manufacturing of the above-mentioned parts, the valve housing 3 is designed as a cold extrusion pressed part and the valve sleeve 1 as well as the pot-shaped valve-seat holding element 7 are designed as deep drawn parts, with the valve-seat holding element 7 in the pot-shaped bottom providing, by means of a stamping process, the two valve-seat surfaces for a return valve 10 and the valve closing element 9 mounted on the valve tappet 4. Another design, meaningful as regards manufacturing and function, arises when the valve tappet 4 is designed as a thin-walled sleeve part, which can be produced at low cost and precisely as a rotary kneaded part or possibly also as a deep drawn part. The simple contours of the thin-walled design of the valve tappet 4 allow a particularly advantageous placement of the pull-back spring 8, which is held concentrically on valve tappet 4, so that one end of its winding is supported on a funnel-shaped extension of the lifter shaft and its other end is supported on the bottom of the pot-shaped valve-seat holding element 7. In the design shown in the drawing, the actual valve closing element 9 is formed by a steel ball that is encompassed in a tong-like manner at the end of the valve tappet 4. In addition, on the side facing away from the valve closing element 9 at the bottom of the pot-shaped valve-seat holding element 7, there is the already mentioned return valve 10—also designed as a steel ball—which is fixed in its position at bypass opening 12 that exhibits the second valve seat at the bottom of the pot by means of a filter pot 11 pushed over the valve-seat holding element 7. Adjusting pin 2 protrudes from within the valve tappet 4 in the direction of the armature 13. The adjusting pin has a polygonal profile which, according to sectional view A—A, has a triangular profile section and can be shifted within the lifter pipe in order to adjust the residual air gap of the armature, forming a press fit with the tappet pipe.

In addition, it needs to be pointed out that after the adjusting pin 2 is completely adjusted all above-mentioned parts can be additionally fixed in their positions in the valve tappet 4 by means of appropriate non-positive and/or positive fits.

Another way of contributing to low manufacturing costs for the electromagnetic valve is that the armature 13, also made from a cold-extrusion pressed part, which, according to the figure, extends in the valve sleeve 1 above the valve housing 3 acting as magnetic core 25. The armature also can be made from a polygonal profile. Preferably the armature can be adjusted in the valve sleeve 1 independently of the position of the-valve tappet 4. Thus, the armature 13 and valve tappet 4 form independent parts which, although they are connected as axial force transmission elements, are effective independently of one another in a radial direction. Since the valve tappet 4 basically is designed like a pipe and the adjusting pin 2 as well as, if applicable, the armature 13 have polygonal profiles, there is an unchecked pressure compensation within the valve tappet 4, which is equipped with a transverse channel and within the valve sleeve 1 into the hollow spaces 15, 16 arranged on both sides of the valve housing 3. Hence, the electromagnetic valve formed into a cartridge hereby only has, as a means of fastening in the block-shaped valve support 6, a relatively thick-walled section of valve housing 3 in the vicinity of the wedge 17 designed as a shoulder 5, at which, due to the axial wedging force-acting on the valve support 6, a primarily non-positive connection of the electromagnetic valve in the location hole 18 of the valve support 6 is obtained. The location hole 18 is designed as a graduated bore, with the edge 20 of the pot-shaped valve-seat holding element 7 being wedged tightly (i.e. providing tightness against fluids) between the shoulder 5 on the valve housing 3 and a step 19 in the valve support 6. The prolongation 31 with the guiding surface 3b on the valve housing 3 extending into the pot-shaped valve-seat holding element 7 ensures that the valve-seat holding element 7 can be safely pre-assembled and handled on the valve housing 3 before the corresponding parts in connection with the filter pot 11 and the return valve 10 included therein are inserted in the valve support 6. For example, the valve sleeve 1 is not only pushed over a cylindrical projecting part with the guiding surface 3a of the valve housing 3, but also attached permanently by means of a welded joint 19 when the adjustment has been completed. Naturally, alternative methods of positive and non-positive fastening can be used instead of the welded joint 19. With the exception of the return valve 10 arranged on the side of the valve, all other above-mentioned parts are arranged concentrically with respect to the longitudinal axis of the valve.

In contrast to the embodiment according to FIG. 1 described above, design variants of the electromagnetic valve, including any details different from FIG. 1a, will now be described. Whenever certain details of the respective valve variants are not described, they correspond to the embodiment shown in FIG. 1a and can be found in the description above.

Figure 1A:
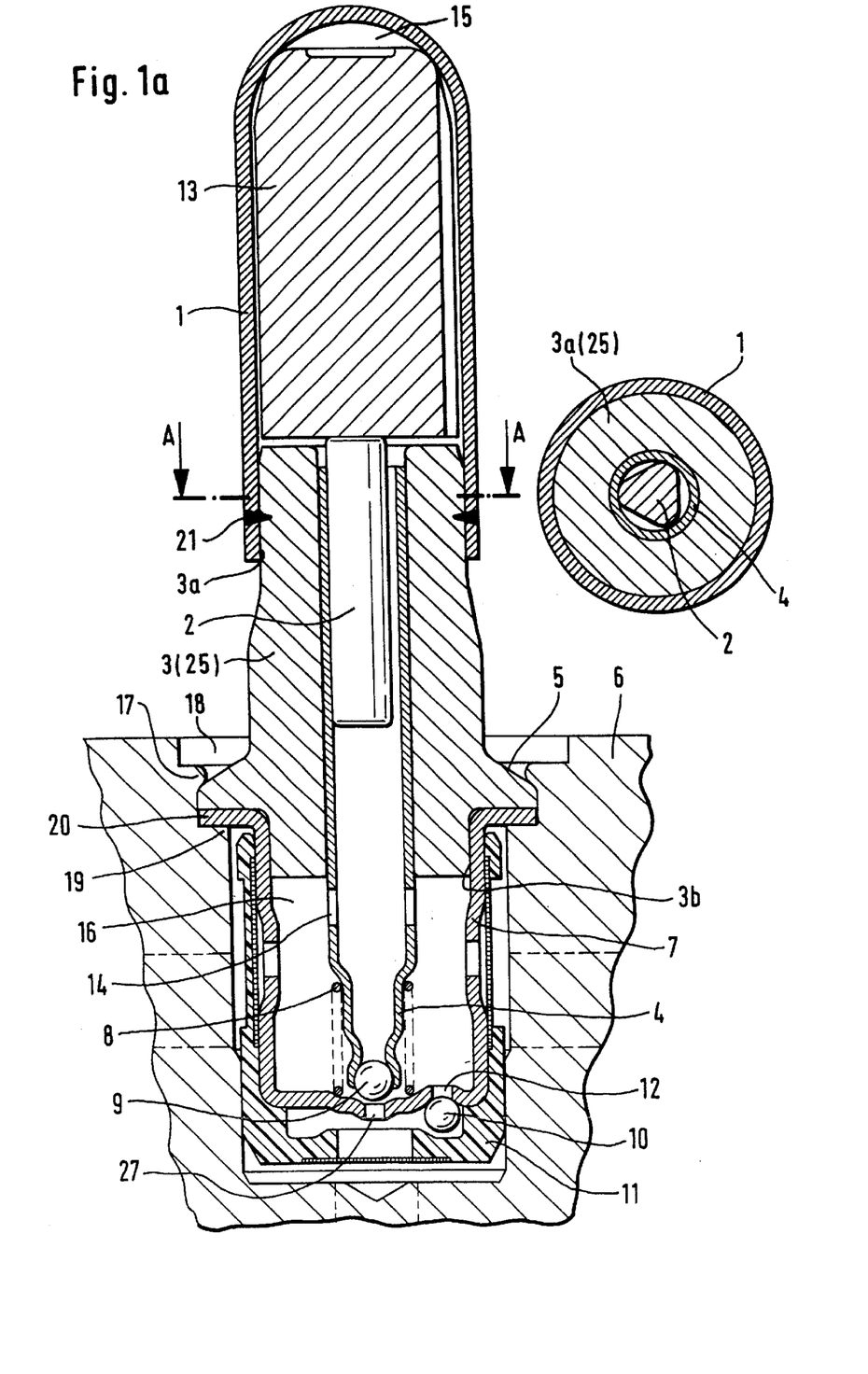
FIGS. 1a to 1e show suitable embodiments of an electromagnetic valve that is open in its starting position.
Figure 1B:
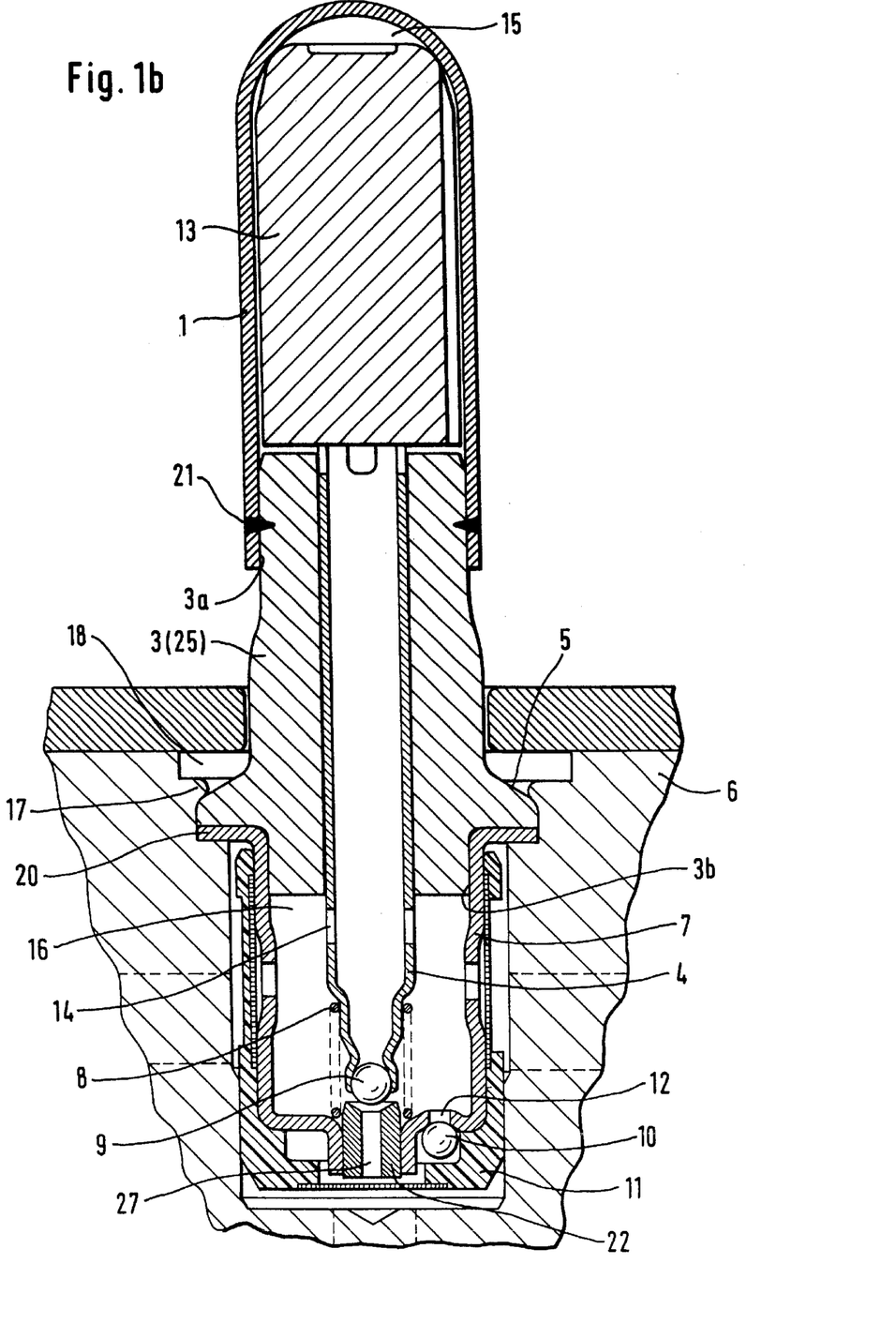

FIG. 1b, contrary to FIG. 1a, shows an electromagnetic valve where a separate sleeve element 22 having a press fit in the valve-seat holding element 7 is pressed into its pot-shaped valve-seat holding element 7. Such sleeve element 22 exhibits a conical sealing surface acting as valve seat on the face turned towards the valve closing element 9. For the purpose of adjusting the residual air gap of the armature, the sleeve element 22 assumes the function of the adjusting pin 2 described in connection with FIG. 1a, since the pipe-shaped valve tappet 4, contrary to FIG. 1, now abuts directly against the face of the armature 13 in FIG. 1b.

Figure 1C:
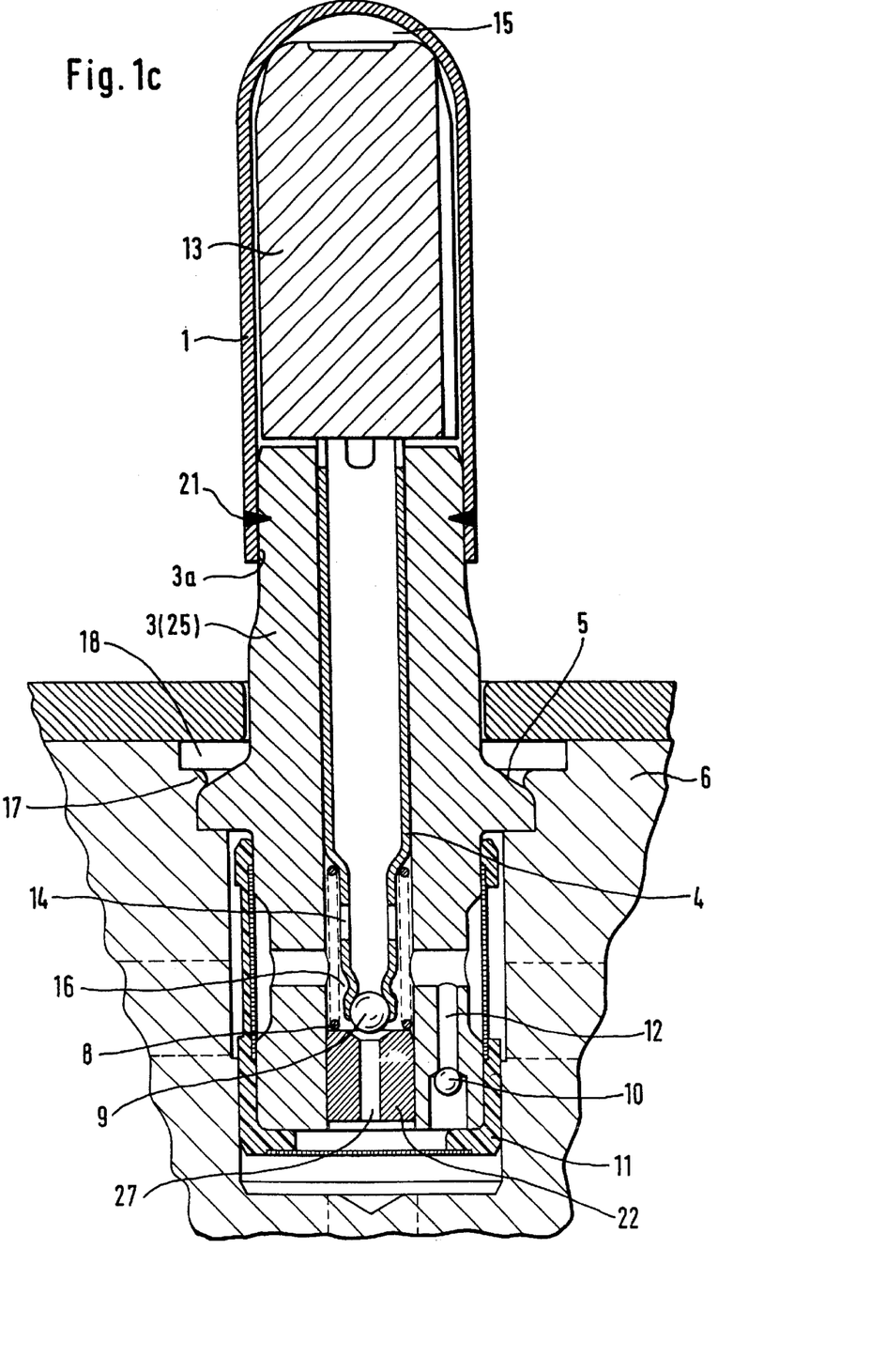

In the embodiment of the electromagnetic valve according to FIG. 1c, the sleeve body 22 described for FIG. 1b also is used; however, with the difference that it is directly inserted by means of a press fit into the valve housing 3 extending in the direction of the filter bottom, so that, contrary to the FIGS. 1a and 1b, the valve-seat holding element 7 forms a single component of the valve housing 3.

Figure 1D:
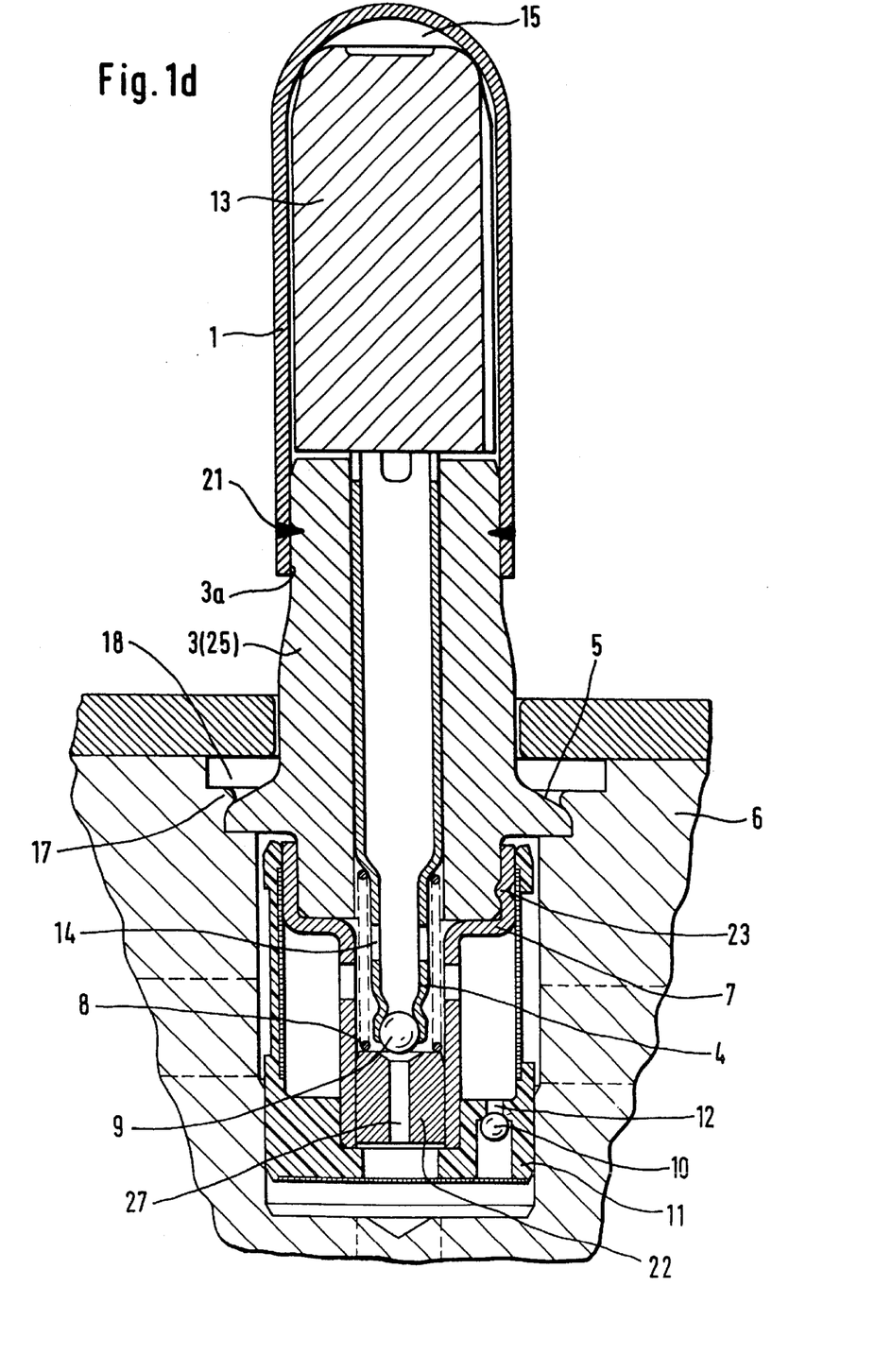

In close approximation of the embodiment according to FIG. 1b, FIG. 1d shows an electromagnetic valve whose pot-shaped valve-seat holding element 7 is provided with a particularly thin, sleeve-shaped section in the area of the solid sleeve element 22, over which the filter pot 11 is slipped. Both the return valve and the bypass channel 12 associated with the return valve 10 are skillfully comprised in the filter pot 11. The valve-seat holding element 7 is fastened to the valve housing 3 by means of a radial wedge attached from outside onto the guiding surface of the thin-walled valve-seat holding element 7, which can be recognized as the nose 23 directed into the prolongation 31 in the selected sectional view.

Figure 1E:
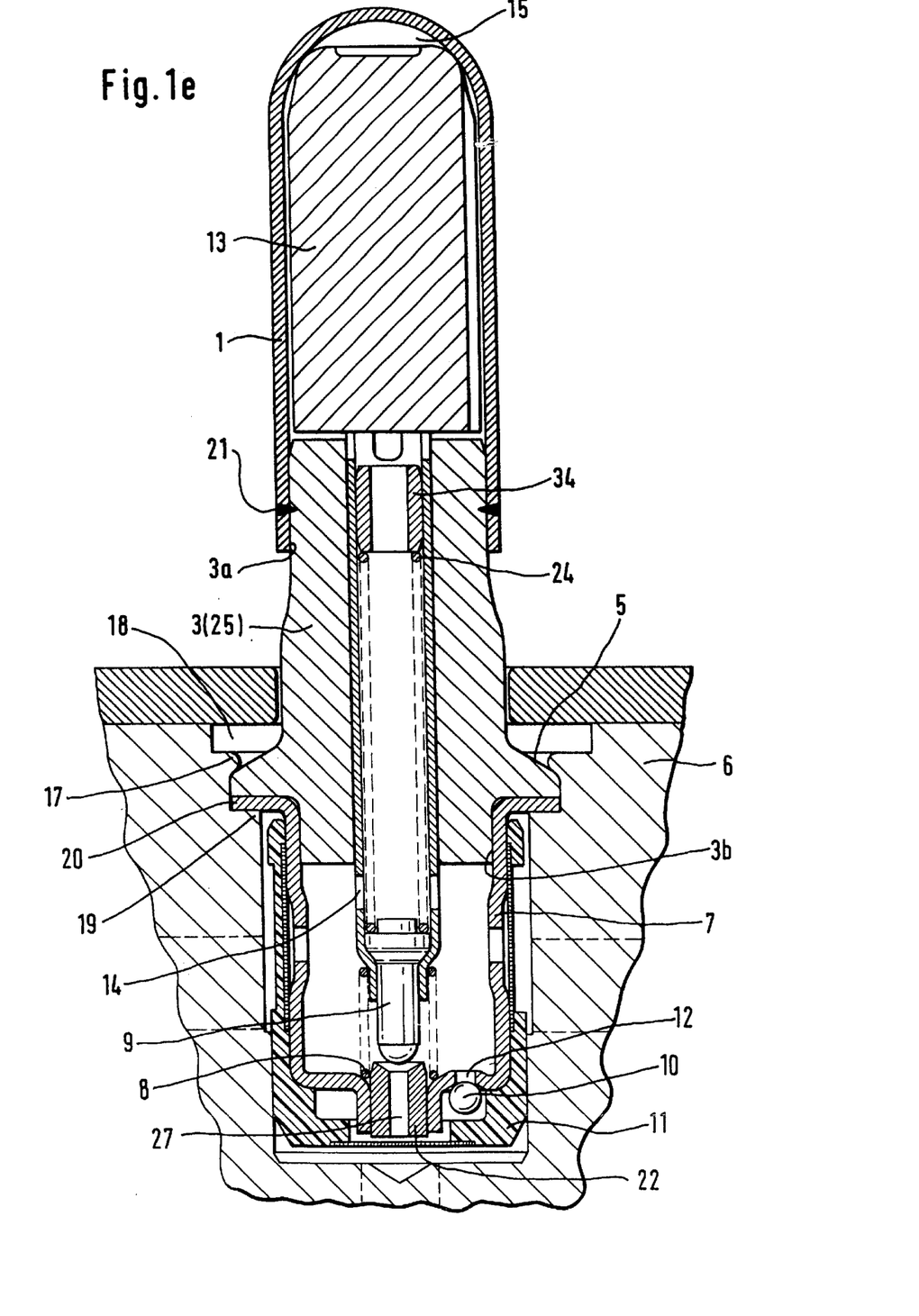

In a surprisingly simple manner, all of the electromagnetic valves shown up to now can assume the function of a pressure control valve, and this will be described below on the basis of FIG. 1e. Due to the fact that the pipe-shaped valve tappet 4 contains a cylindrical hollow space of correspondingly generous dimensions, the valve-closing element 9 can be arranged in an axially movable manner instead of the hitherto described fixed arrangement of the valve-closing element 9. For this purpose, the valve-closing element 9, taking the form of a plunger, would be inserted from above into the hollow space of the valve tappet 4 until its conical stop shoulder abuts against the tapered end of the tappet and, at the same time, its closing element protrudes from the open end section of the valve tappet 4 and is turned towards, by means of spring pressure, the sleeve element 22 or valve-seat holding element 7. The opening pressure is decisive as regards the function of pressure control valve and is determined by means of a valve spring 24, which is wedged between the valve-closing element 9 and a stop pressed into the valve tappet 4. Thus, in the electromagnetically activated closed position of the valve, the valve-closing element 9 abuts tightly (i.e. providing tightness against fluids) against the valve-seal holding element 7 in a manner known in the prior art until the hydraulic pressure below the valve-seat holding element 7 exceeds the pressure applied by the valve spring 24 onto the valve-closing element 9, causing the valve-closing element 9 to be lifted from its valve seat and thereby realizing the function of a pressure control valve.

In the following, the essential characteristics of the invention will be explained explicitly on the basis of an electromagnetic valve that is normally closed in its starting position (see FIG. 2a) Subsequently, possible variations of the components of the valve will be described on the basis of FIGS. 2b to 2d.

Figure 2A:
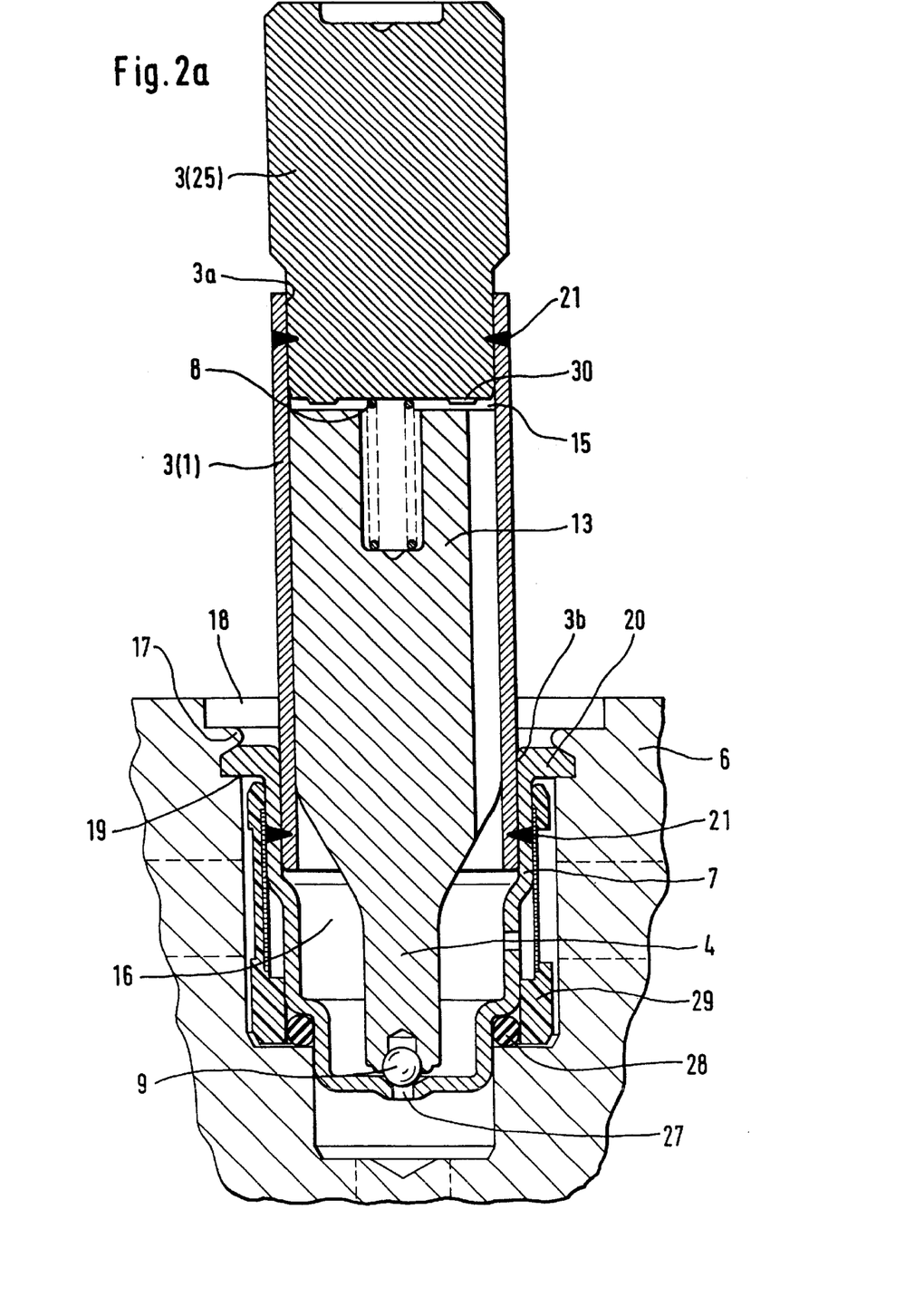
FIGS. 2a to 2d show various design variants of an electromagnetic valve that is closed in its starting position.

Like the electromagnetic valves according to FIGS. 1a to 1e, the electromagnetic valve according to FIG. 2a has an armature 13 produced as a cold extrusion pressed part, a magnetic core 25 made from a cold extrusion pressed part, and a pot-shaped valve-seat holding element 7 that is attached to the valve housing 3. To the extent that thin-walled sleeve parts are applied, they are also designed, as in the above embodiments, as deep drawn parts or, possibly, rotary kneaded parts. In this connection, FIG. 2a shows a sleeve-shaped valve housing 3 that is designed as a deep drawn part. Its two end sections form guiding surfaces 3a, 3b, which are limited on one side by a magnetic core 25 and on the other side by the pot-shaped valve-seat holding element 7. Both parts 25, 7 arranged on the sleeve-shaped valve housing 3 preferably are attached permanently by means of a welded joint 19. Within these parts, which were already described above, there is an armature 13 that has on its windings—as shown in FIG. 1—either pressure compensation grooves or a cornered profile in order to ensure unchecked hydraulic pressure compensation in the valve. As already mentioned in connection with FIG. 1, the armature 13 and magnetic core 25 are designed as cold extrusion pressed parts, for which purpose a material with the identification code X8Cr17 or alternatively a material with the identification code X6Cr17 is suitable. The sleeve-shaped valve housing 3 preferably is made of austenitic steel according to classification 1.43.03. The same material is used for the pot-shaped valve-seat holding element 7, with this material also being selected for the previously mentioned sleeve components of the electromagnetic valves according to FIGS. 1a to 1e. The electromagnetic valve according to FIG. 2a is attached in the valve support 6 directly on the edge 20 of the pot-shaped valve-seat holding element 7 by means of an outside wedge. The pot of the valve-seat holding element 7, as in all previous embodiments, exhibits at least one radially and axially oriented hole, with the hole arranged in the longitudinal axis of the valve forming the actual valve-seat holding element 7 for the valve-closing element 9 by means of a stamping process, whereas the hole penetrating the valve-seat holding element 7 at a right angle thereto as a rule is designed as a hole in order to establish a connection for the pressure medium between the channels in the valve support 6 located below and above the valve-closing element 9 when the valve is in an open position. A ball wedged into the armature 13 is preferably used as the valve-closing element 9, and it is pressed onto the valve-seat surface of the valve-closing element 9 by the effect of a pull-back spring 8 that is arranged between the armature 13 and magnetic core 25. The pot-shaped valve-seat holding element 7 is sealed in a stepped hole of the valve seat 6 by means of an O-ring 28 arranged between the valve-seat holding element 7 and valve support 6. A ring-type filter 29 extends along the valve-seat holding element 7 up to the O-ring 28, providing additional holding and/or transportation protection for the O-ring 28 prior to actual assembly in the stepped hole of the valve support 6. Towards the outside, the electromagnetic valve merely is sealed and fastened in the valve support 6 by means of a simple outside wedge, whereas the lower seal created by the O-ring 28 in the valve support 6 prevents a short circuit current between the channel flowing into valve support 6 below the valve-closing element 9 and the transverse channel located at the level of the ring-type filter. The magnetic core 25 is pressed into the open area of the sleeve-shaped valve housing 3 like a stop and fixed in place permanently by means of a welded seam after completion of the required adjusting measures. Due to corresponding projections between the magnetic core 25 and armature 13, which may be arranged either on one or the other of the above-mentioned parts 13, 25, any freezing of the armature is prevented. To achieve space-saving holding and guidance of the pull-back spring, the armature 13 is provided with a longitudinal hole corresponding to the Figure. All parts described are in a coaxial position.

Based on FIG. 2a, deviating details will be described below; these can be viewed as alternatives or supplements to FIG. 2a.

Figure 2B:
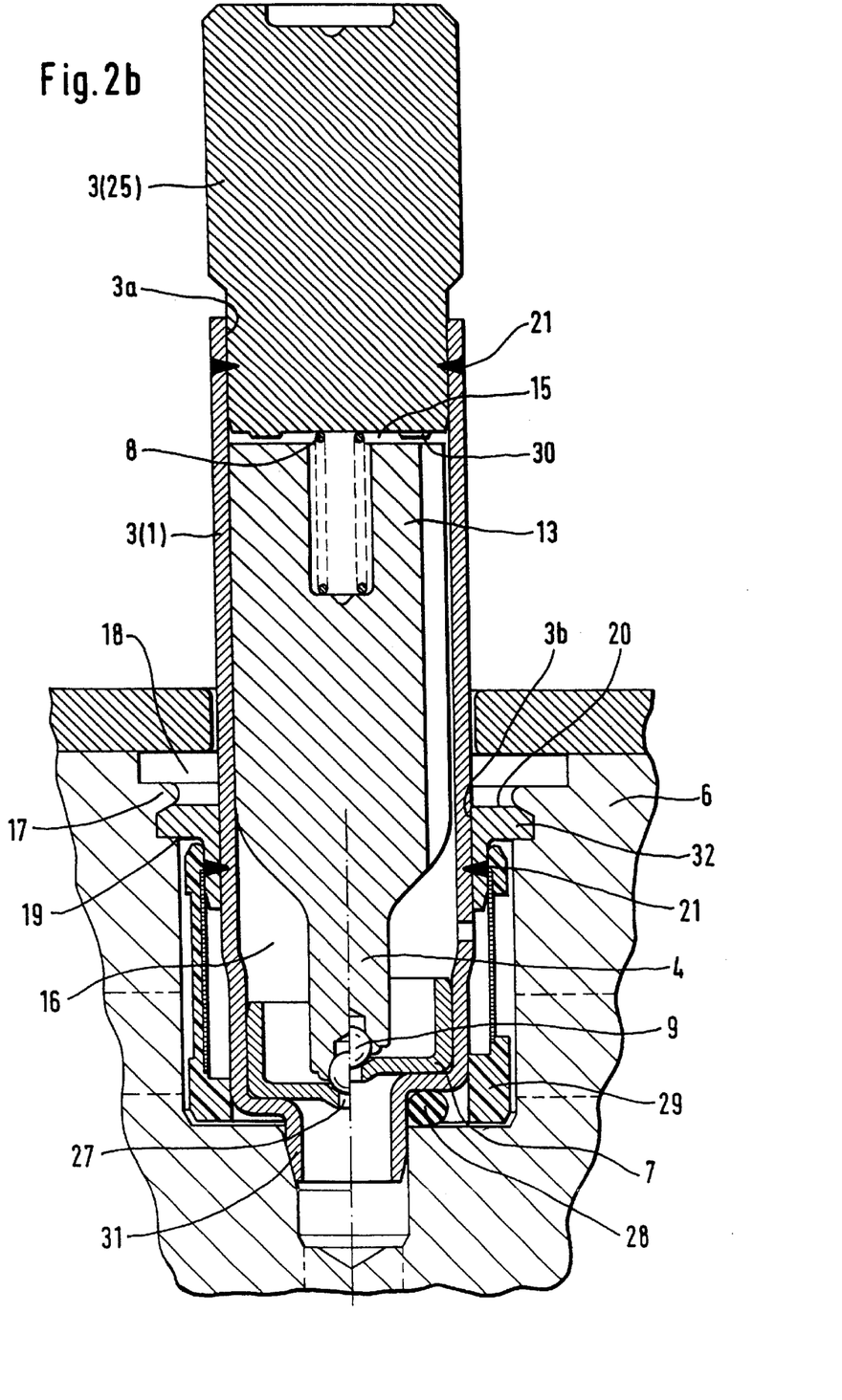

FIG. 2b, based on the electromagnetic valve according to FIG. 2a, shows a detail variant of the valve housing 3, whose sleeve-shaped section extends up to below the valve-closing element 9 and there holds a pot-shaped valve-seat holding element 7 which, contrary to FIG. 2a, is not connected by welding to the valve housing 3, but instead is merely pressed up to its stop onto an offset step of the valve housing 3. If a knife-shaped prolongation 31 of the valve housing 3 extends from this area into the lower channel connection of the valve support 6, it can, if required or desired, cause a metallic sealing, which is shown on the left side of the sectional view in the representation. In the representation shown on the right side of the longitudinal axis of the valve, the O-ring 28 already described in connection with FIG. 2a is shown as an additional sealing element, which, however, gives rise to additional costs. An annular part 32 wedged into the valve support 6 is joined by welding to the valve housing 3 in order to seal off and fasten the valve.

Figure 2C:
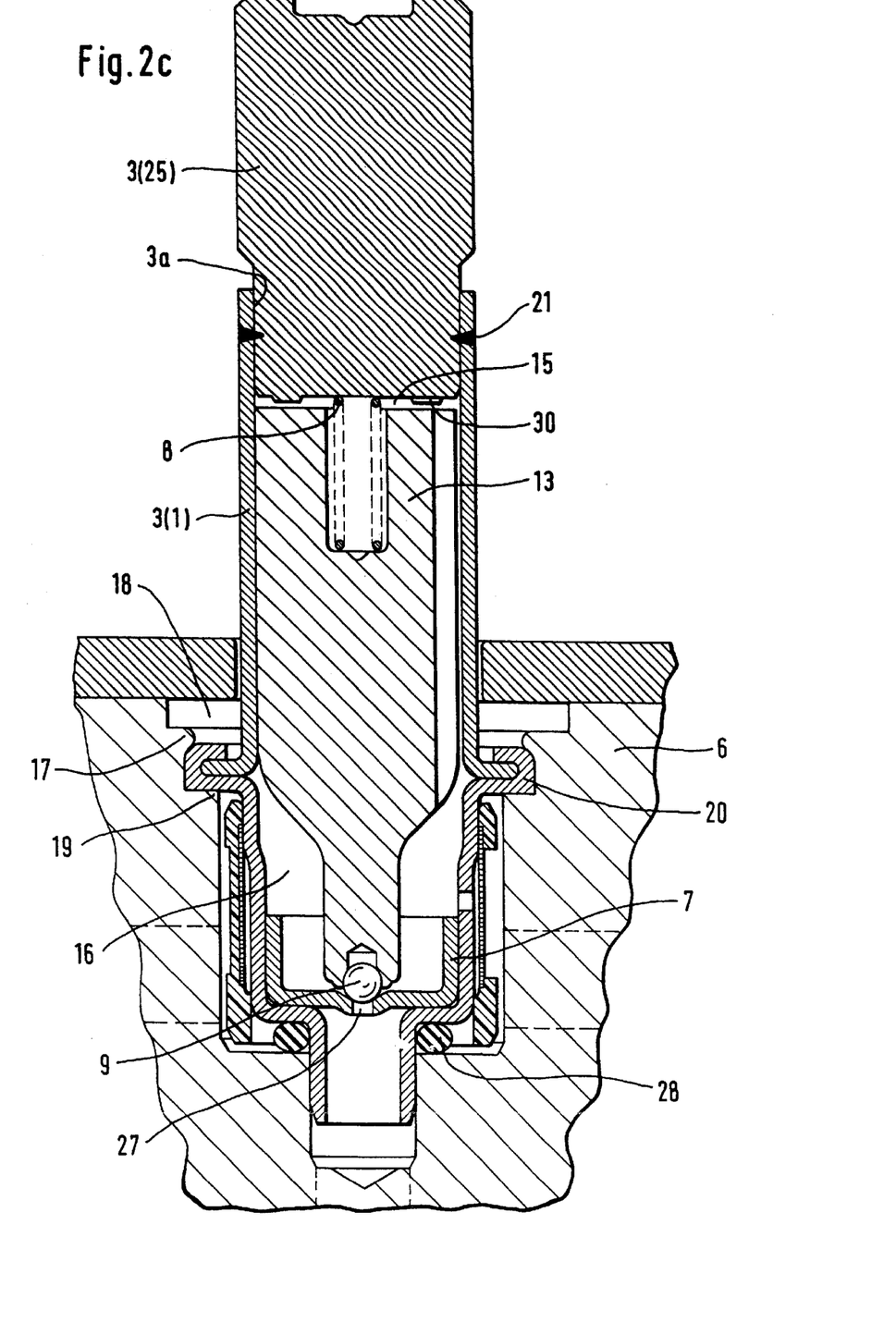

FIG. 2c shows a two-part embodiment in the form of a flanged connection of the two parts of the sleeve, with the outer edge 20 of the flanged connection simultaneously forming the wedging area of the electromagnetic valve in the valve support 6. All other details correspond to the descriptions given for FIGS. 2a and 2b.

Figure 2D:
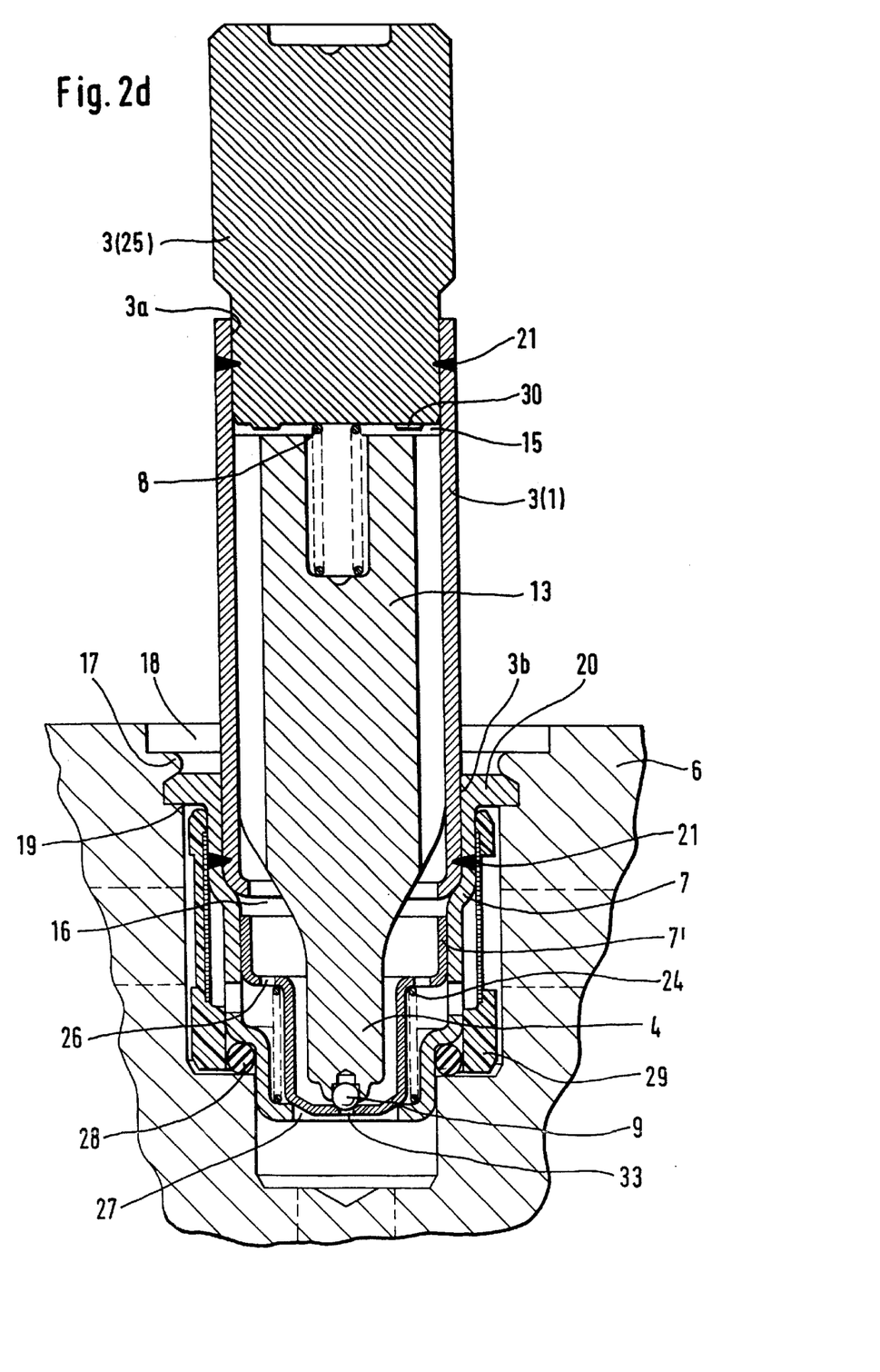

FIG. 2d shows an electromagnetic valve that is closed in its starting position. It exhibits an additional function in the form of a so-called two-step valve, for which purpose the valve-closing element 9 arranged on the armature 13 does not abut directly against the valve-seat holding element 7 wedged into the valve support 6, but contacts a second valve-seat holding element 7' that is guided movably within the above-mentioned valve-seat holding element 7. A valve spring 24 is arranged between both valve-seat holding elements 7, 7', and it ensures that, when the armature 13 is excited electromagnetically, the valve-seat holding element 7', which is designed as an intermediate pot, follows the motion of the armature 13, provided that pressure compensation prevails on both sides of the valve-seat holding element 7', Thus, the inner valve-seat holding element 7' remains at the valve-closing element 8 of the armature 13 and, consequently, the relatively small valve-seat opening stays closed due to the ball-shaped valve-closing element 9. A connection for the pressure medium between the pressure medium channels running vertically and horizontally necessarily is established through the relatively large cross-section of the valve seat, arranged between the two valve-seat holding elements 7, 7', when the armature 13 is in an excited state. When the hydraulic pressure prevailing above the valve-closing element 9 is greater than that below the valve-closing element 9, the inner valve-seat holding element 7' is pushed against the outer valve-seat holding element 7 even when the armature 13 is excited electromagnetically; however, only the relatively small valve-seat opening of the inner valve-seat holding element 7' is released by the valve-closing element 9. The outer and inner valve-seat holding elements 7, 7' are designed as cold extrusion or deep drawn parts, so that in particular relatively small parts, which can be produced simply and precisely, are to be inserted in the location hole of the valve support 6. Like the outer valve-seat holding element 7, the inner valve-seat holding element 7' also should be provided with generously dimensioned pressure medium holes 26 and gliding surfaces in the vicinity of the pot expansion in order to ensure that the inner valve-seat holding element 7 can be guided safely.

Figure 3:
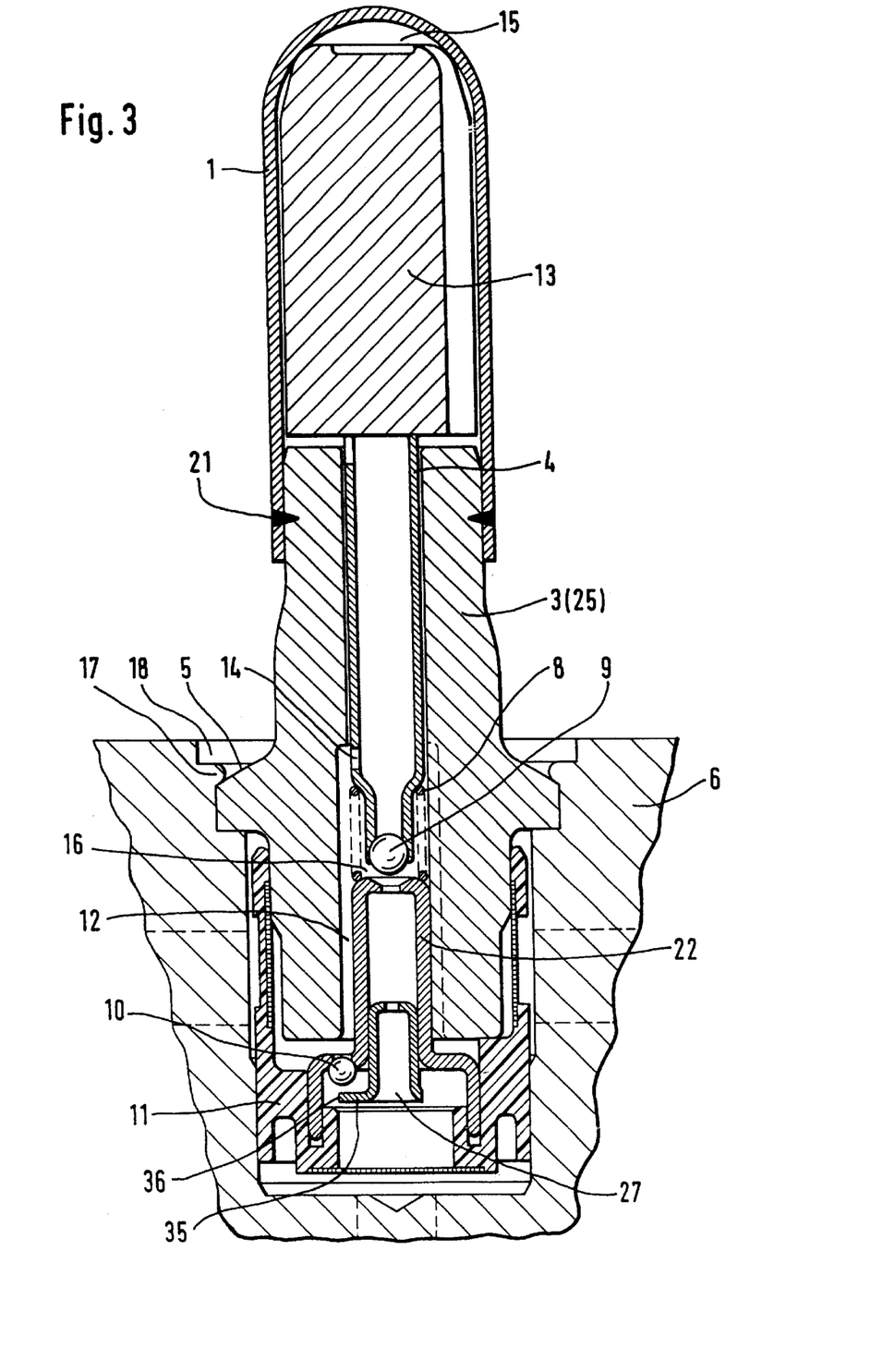
FIG. 3 provides an embodiment of the electromagnetic valves shown in FIGS. 1a to 1e.

Contrary to the valve design according to FIG. 1c, the electromagnetic valve according to FIG. 3 shows a hollow cylindrical valve housing 3 that is somewhat shortened in its length. At the lower end a sleeve element 22, preferably designed as a deep drawn part, is pressed into the hollow space 16, which, on the one hand, exhibits a valve-seat contour facing towards the valve-closing element 9 and, on the other hand, is provided with another valve-seat contour on the opposite end for the return valve 10. In order to prevent the return valve 10 from falling out and to position it firmly in its place, a sleeve part 35 is inserted from below into the pressure medium hole 27 penetrating the sleeve element 22, which, as in the previous example of an embodiment, assumes the function of a defined opening due to the small, selected cross-section of the opening. Outside its pressed-in length in the sleeve element 22, the sleeve part 35 exhibits a projecting end axially and radially respectively, between which the ball-shaped return valve 10 is held on the extended area of the sleeve element 22 exhibiting the valve-seat contour. In the example of the embodiment according to the representation, the radial projecting end can be recognized as tongue 36 of the sleeve part 35, which is designed as a deep drawn part. Hence,the sleeve part 35 together with the return valve 10 and sleeve element 22 forms a pre-assembled unit, which is pressed into the channel-like hollow space 16 as far as necessary for setting the valve stroke. The bypass opening 12 already described in connection with FIG. 1c now extends as a longitudinal groove in the area of the press fit along the lateral surface of the sleeve element 22 into the hollow space 16. The filter pot 11 is pushed over the end of sleeve part 35 projecting from the stepped sleeve element 22, thereby establishing a fixed connection that is tight against fluids. Any details of the valve according to FIG. 3 not described correspond to the description of the valve according to FIG. 1c or one of its variants according to FIGS. 1a, 1b, 1d or 1e.

What is claimed is:

1. An electromagnetic valve, comprising:
    a valve tappet guided in a valve housing that exhibits a valve-closing element,
    a valve-seat holding element facing the valve-closing element which forms an independent subassembly together with the valve housing,
    an armature that activates the valve tappet and can be excited electromagnetically,
    a valve coil arranged on the valve housing, wherein the armature is designed as a cold extrusion pressed part and wherein the valve housing is designed as a deep drawn part or cold extrusion pressed part.

2. An electromagnetic valve as claimed in claim 1, wherein the armature is made of a material according to identification code X8Cr17 or X6Cr17.

3. An electromagnetic valve as claimed in claim 1, wherein the valve housing has an end section with a guiding surface, onto which the valve-seat holding element is pushed, and wherein the valve-seat holding element has the form of a pot, whose edge is attached by means of a wedge to a step of a location hole in a valve support.

4. An electromagnetic valve as claimed in claim 3, wherein the valve-seat holding element is designed as a deep drawn part from a thin-walled metal coat and that a valve seat limiting a pressure medium hole is arranged on the bottom of its pot by means of a stamping process.

5. An electromagnetic valve as claimed in claim 4, wherein the valve-seat holding element supports a filter pot along its wall, which covers the pressure medium hole made in the valve-seat holding element.

6. An electromagnetic valve as claimed in claim 1, wherein a part of the valve housing forming a magnetic core is designed as a cold extrusion pressed part according to material classification X8Cr17 or X6Cr17.

7. An electromagnetic valve as claimed in claim 1, wherein the valve tappet is formed into a thin-walled pipe part from a rotary kneaded part or deep drawn part, and wherein the valve-closing element is supported on its end section facing the valve-seat holding element.

8. An electromagnetic valve as claimed in claim 7, wherein an adjusting pin is pressed into the end section of the pipe-shaped valve tappet facing the armature, and wherein the end of the adjusting pin projecting from the valve tappet is supported on the armature.

9. An electromagnetic valve as claimed in claim 8, wherein a pull-back spring is clamped between the valve tappet and the valve-seat holding element.

* * * * *